United States Patent Office 3,128,274
Patented Apr. 7, 1964

3,128,274
6-CYANOPURINE AND 2-AMINO-6-CYANOPURINE
George H. Hitchings, Tuckahoe, Gertrude B. Elion, Bronxville, and Lottie E. Mackay, Pleasantville, N.Y., assignors to Burroughs Wellcome & Co. (U.S.A.) Inc., Tuckahoe, N.Y., a corporation of New York
No Drawing. Filed July 19, 1962, Ser. No. 211,104
3 Claims. (Cl. 260—252)

This invention relates to the novel compounds 6-cyanopurine and 2-amino-6-cyanopurine which may be represented by the formula

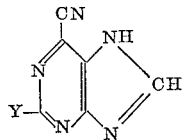

wherein Y is selected from the class consisting of hydrogen and the amino group. These compounds are particularly of value and interest as being intermediates in the preparation of other purine compounds of established activities in the treatment of experimental tumors in rodents, particularly against adenocarcinoma 755. This application is a continuation-in-part of applications Serial No. 525,382, filed July 29, 1955, now abandoned, and Serial No. 853,684, filed November 18, 1959, now Patent No. 3,098,074.

The derivatives may be conveniently prepared by the reaction of a 6-halogen purine with a metal cyanide in an inert solvent. The resulting derivative can then be readily converted to form amino and amino alkyl derivatives, which can then be hydrolyzed to form amides, carboxylic acid and ester derivatives or, alternatively, converted into amidines.

The following examples are illustrative:

*Example 1.—6-Cyanopurine*

A mixture of 29.5 g. of 6-iodopurine, 16 g. of cuprous cyanide and 300 ml. of dry pyridine was heated under reflux conditions for two hours. The reaction mixture was cooled, filtered and the solid residue washed with ether. To the combined pyridine and ether filtrates was added 1 liter of ether and the precipitate filtered off, after chilling, and discarded. The filtrate was taken to dryness under reduced pressure. The residue, consisting of crude 6-cyanopurine, was dissolved in 100 ml. of saturated aqueous sodium chloride solution and extracted five times with ether. The ether extracts, after drying, were evaporated to dryness to give 8.9 g. of 6-cyanopurine, M.P. 177–178°.

*Example 2.—6-Thiocarboxamidopurine*

Hydrogen sulfide was passed through an ice-cooled solution of 1.45 g. of 6-cyanopurine in 20 ml. of saturated absolute ethanolic ammonia for four hours. The yellow suspension was evaporated to dryness on the steam bath to give 1.75 g. of 6-thiocarboxamidopurine. After recrystallization from methanol, the product melted at 240–242° with decomposition.

*Example 3.—2-Amino-6-Cyanopurine*

A mixture of 3 g. of 2-amino-6-iodopurine, 1.6 g. of cuprous cyanide and 50 ml. of dry pyridine was heated under reflux conditions for 4 hours. The pyridine was removed under reduced pressure and the solid residue was then leached twice with 5 ml. of pyridine plus 100 ml. of ether, and washed with 125 ml. of acetone. The crude 2-amino-6-cyanopurine was extracted from the solid residue with 40 ml. of dimethylformamide. On addition of 160 ml. of water to the dimethylformamide solution, the product precipitated. It was purified by sublimation at 180° at 10μ. The 2-amino-6-cyanopurine does not melt below 310°. Its ultraviolet absorption spectrum shows λ max.=355 mμ at pH 1, λ max.=302, 355 mμ at pH 11.

*Example 4.—2-Amino-6-Thiocarboxamidopurine*

This compound was prepared by the same procedure used in Example 2 employing 2-amino-6-cyanopurine in place of 6-cyanopurine.

What we claim is:
1. A compound of the formula

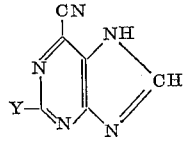

wherein Y is selected from the class consisting of hydrogen and the amino group.
2. 6-cyanopurine.
3. 2-amino-6-cyanopurine.

No references cited.